United States Patent [19]

Hösel

[11] Patent Number: 4,494,204
[45] Date of Patent: Jan. 15, 1985

[54] CARDING MACHINE OR ROLLER CARD

[75] Inventor: Fritz Hösel, Monchen-Gladbach, Fed. Rep. of Germany

[73] Assignee: Trützschler GmbH & Co. KG, Monchen-Gladbach, Fed. Rep. of Germany

[21] Appl. No.: 380,294

[22] Filed: May 20, 1982

[30] Foreign Application Priority Data

May 20, 1981 [DE] Fed. Rep. of Germany ....... 3120133

[51] Int. Cl.³ .................... G06F 15/46; D01G 15/40; D01G 15/48; D01H 5/42
[52] U.S. Cl. ...................................... 364/470; 19/105; 19/106 R; 19/240; 19/300; 57/264
[58] Field of Search ................. 364/470; 19/240, 241, 19/105, 106 R, 300, 150; 406/70; 57/264, 265, 81, 93, 92, 100

[56] References Cited

U.S. PATENT DOCUMENTS

| 3,169,664 | 2/1965 | Meinicke | 222/1 |
| 3,984,665 | 10/1976 | Shriver et al. | 364/180 |
| 4,194,349 | 3/1980 | Lane | 57/265 |
| 4,199,844 | 4/1980 | Geotzinger | 19/240 |
| 4,219,289 | 8/1980 | Trützschler | 406/70 |
| 4,242,860 | 1/1981 | Wehde et al. | 57/81 |
| 4,249,369 | 2/1981 | Tsuzuki et al. | 57/81 |
| 4,344,582 | 8/1982 | Rapp et al. | 364/470 |
| 4,375,149 | 3/1983 | Hartmannsgruber | 57/81 |
| 4,387,486 | 6/1983 | Keller et al. | 19/240 |
| 4,393,547 | 7/1983 | Hosel | 19/240 |
| 4,408,447 | 10/1983 | Sloupensky et al. | 364/470 |

FOREIGN PATENT DOCUMENTS

| 2944428 | 5/1981 | Fed. Rep. of Germany . |
| 1598771 | of 0000 | United Kingdom . |
| 1288475 | 9/1972 | United Kingdom . |
| 1365188 | 8/1974 | United Kingdom . |
| 1404761 | 9/1975 | United Kingdom . |
| 2000332 | 1/1979 | United Kingdom . |
| 2009451 | 6/1979 | United Kingdom . |
| 2042771 | 9/1980 | United Kingdom . |
| 2068149 | 8/1981 | United Kingdom . |

OTHER PUBLICATIONS

Gruber, M., Möller-Nehring, P., "A Microprocessor-Based Digital Speed Controller in the Modulpac C System," Siemens Power Engineering 1, (1979), No. 4, pp. 114 to 116.
Barnes et al., "Using Finite-State Models in Instrumentation Software," IEEE Transactions, vol. 1 EC1-25, No. 2, May 1978, pp. 90-101.

Primary Examiner—Jerry Smith
Assistant Examiner—John Lastova
Attorney, Agent, or Firm—Spencer & Frank

[57] ABSTRACT

Apparatus for forming fiber material into a length of sliver. The apparatus includes: a machine for receiving such fiber material and forming it into the length of sliver; sensors for monitoring the operation of the machine and providing signals representative of that operation; an analog/digital converter connected to the sensors for receiving the signals provided by the sensors and converting those signals into digital representations of the operation of the machine; a digital electronic control unit connected to receive the digital representations formed by the analog/digital converter and including a microprocessor having memories, a device for generating digital representations of desired values of selected operating parameters of the machine, and a device performing operational, regulating, control and display functions, the control unit being arranged to provide digital signals for regulating the operation of the machine; a digital/analog converter connected to the control unit for deriving analog signals corresponding to the digital signals provided by the control unit; and a controllable regulator controlled by the analog signals derived by the digital/analog converter for regulating the operation of the machine.

24 Claims, 6 Drawing Figures

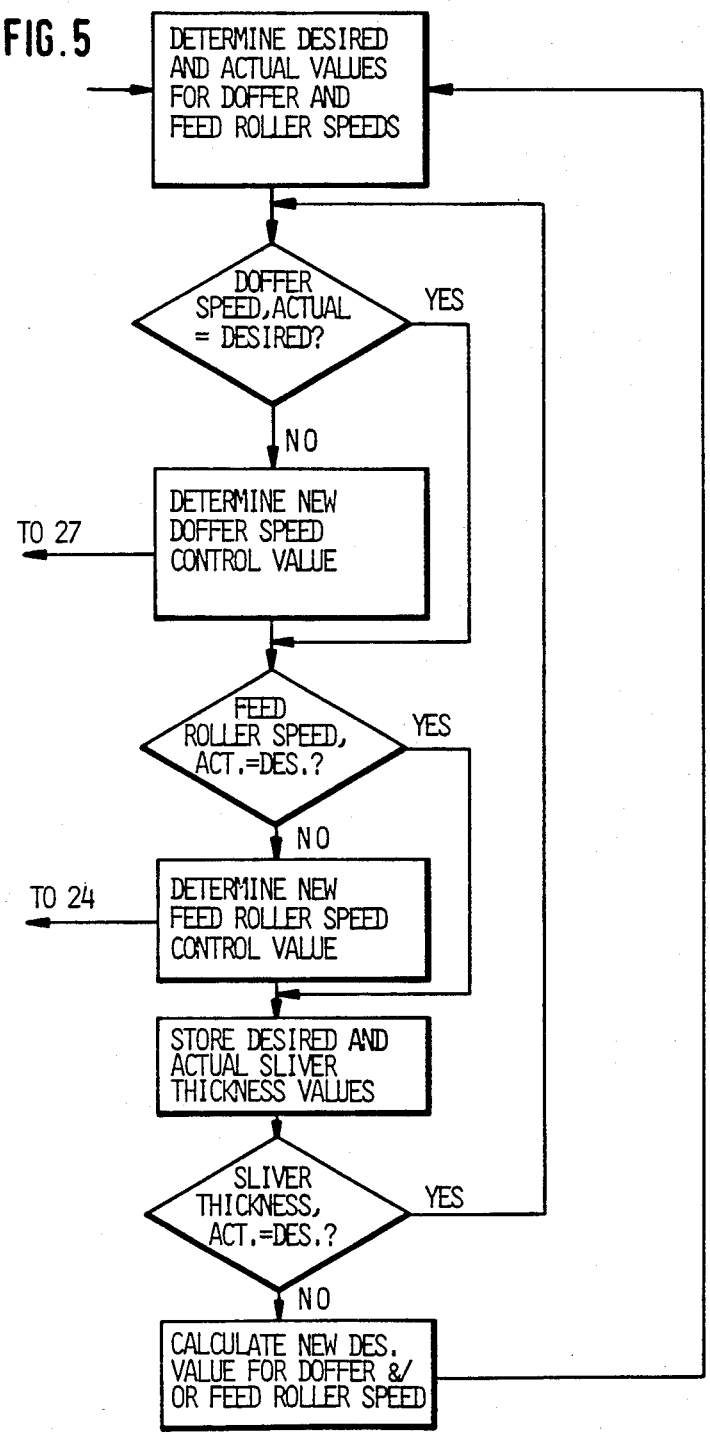

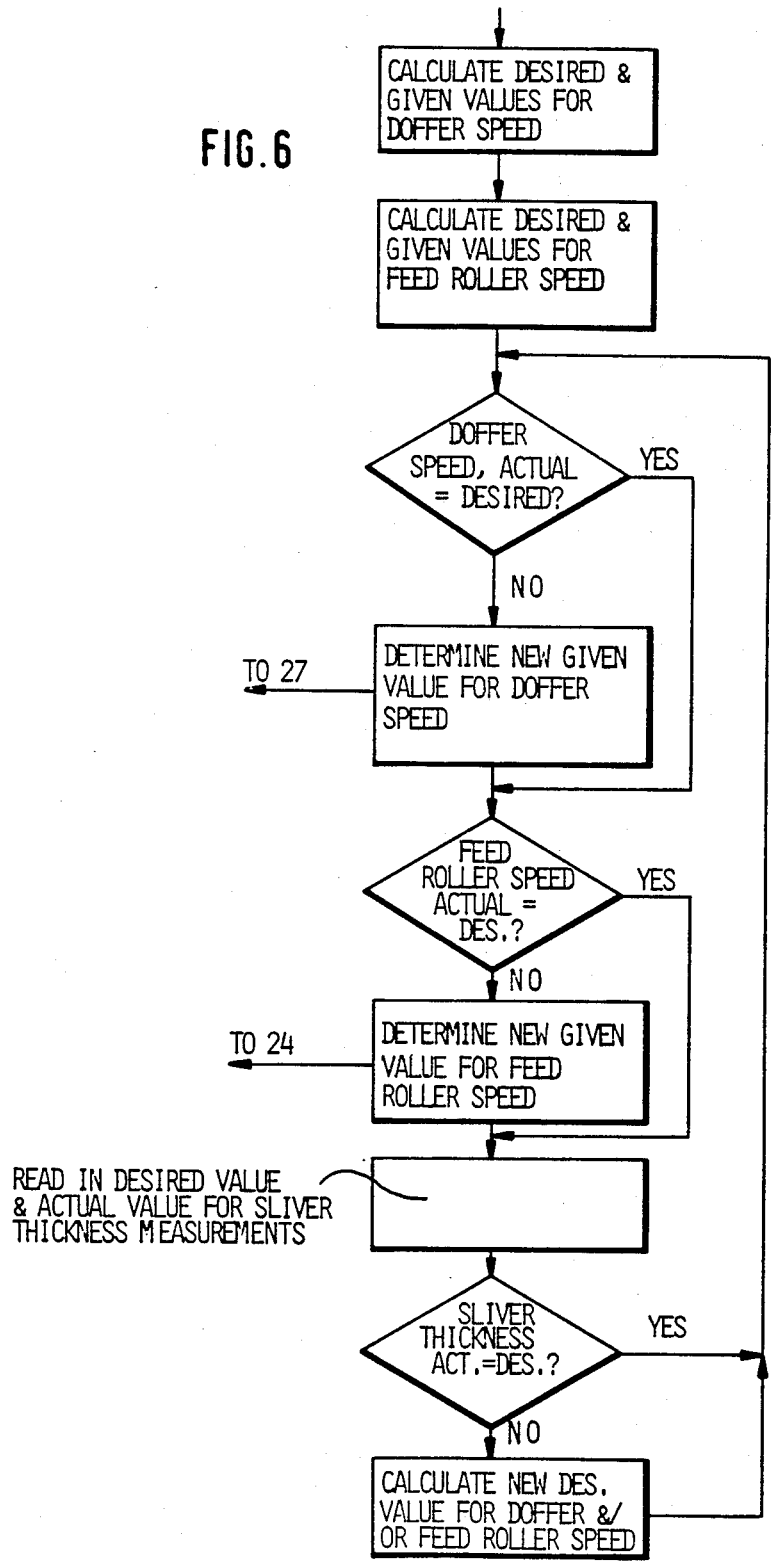

CARDING MACHINE OR ROLLER CARD

BACKGROUND OF THE INVENTION

The present invention relates to a machine which forms fiber material into a length of sliver, such as a carding machine or a roller card, and which includes measured value sensors for generating input values and an electronic conrol unit for forming setting values which can be fed to setting members.

In a known carding machine, regulation and control of the type and quantity of fiber material processed is effected by a plurality of separate devices. For example, delivery speed and draft are each controlled by a separate electronic motor control for the drives of the feed roller and of the doffer. The regulation of the thickness of the sliver leaving the carding machine is effected, for example, independently thereof by way of a pneumatic signal fed to an lectric three-point regulator which produces an electrical output signal to cause the fiber material fed into the carding machine to be regulated. All of this makes the system rather expensive. Moreover, various components, such as the electronic motor control and the three-point regulator, are subject to malfunction.

SUMMARY OF THE INVENTION

It is an object of the present invention to provide a machine of the above-mentioned type which avoids the above-mentioned drawbacks, which permits, in particular, central regulation and control of the type and quantity of fiber material processed and which, as a system, is less expensive and less subject to malfunction than prior art machines.

The above and other objects are achieved, according to the present invention, by the provision of apparatus for forming fiber material into a length of sliver, which apparatus includes: a machine for receiving such fiber material and forming it into the length of sliver; sensors for monitoring the operation of the machine and providing signals representative of that operation; an analog/digital converter connected to the sensors for receiving the signals provided by the sensors and converting those signals into digital representations of the operation of the machine; a digital electronic control unit connected to receive the digital representations formed by the analog/digital converter and including a microprocessor having memories, a device for generating digital representations of desired values of selected operating parameters of the machine, and a device performing operational, regulating, control and display functions, the control unit being arranged to provide digital signals for regulating the operation of the machine; a digital/analog converter connected to the control unit for deriving analog signals corresponding to the digital signals provided by the control unit; and a controllable regulator controlled by the analog signals derived by the digital/analog converter for regulating the operation of the machine.

A significant feature of the invention resides in the provision of the circuit, for example for regulating the speed of, for example, the feed roller and of the doffer by the cooperative action of the measuring value sensors, the microcomputer in conjunction with output converters, for example thyristors, and the regulator members.

A costly and malfunction prone electronic motor control is no longer necessary. Simultaneously, the necessary related functions, i.e. the matching of speed between feed roller, doffer and carding machine cylinder, are realized. Processing of the measured and setting signals for thickness regulation of the sliver is likewise effected by the microcomputer. The continuous monitoring of all significant measured values permits the early detection and localization of errors. In an advantageous manner, the microcomputer can simultaneously realize a direct speed regulation of the drive for the feed roller, the doffer, the tuft feed connected upstream, or the like. The use of an electronic three-point control is no longer required.

Due to the ability of the microprocessor to store data, it is possible to store optimum values as determined once for a given lot, e.g. values for draft, delivery rate and the like, and to reuse such values for processing a similar lot if required, without the need for resetting so that no additional setting work is required when lots are changed. The regulating behavior for the drive motors is fixed by the program and can be varied at will, e.g. PI behavior, start-up integrator and the like.

Other advantageous features are described below.

By using a guide computer, various tasks can be performed:

(a) error detection and localization (clear test) for carding master and the like;

(b) compilation of operating data (dead times, production, breaks in the sliver, flaws);

(c) information regarding maintenance, cleaning and repair work (operating hour counter);

(d) for a group of cards as determined by the guide computer, all cards can be programmed or adjusted for a certain lot;

(e) each individual carding machine can be corrected or influenced by the guide computer (production rate and the like).

Because of the "intelligence" of the system, it is possible to act at once if there are any malfunctions and to prevent the occurrence of possibly disadvantageous effects, as shown by the following examples:

Breaks in a conductor, operator errors or the like may provide an indication that 50,000 meters of sliver have been filled into a can but the system memory indicates that only 9000 m/can is accurate. Before the incorrect can fill of 50,000 m/can is put into operation, the guide computer or some other report inquires from the operator whether this value is correct. Only the correctness is expressly confirmed, e.g. by a change in coilers, will the instruction be implemented. Information that a certain production rate belongs to a certain speed of the feed roller is also stored. If it is noted that the drive motor for the feed roller suddenly has a speed which exceeds the given limit, the machine is shut down at once and the error is reported, localized and possibly the situation is corrected automatically. Even if the speed of the cylinder drops, e.g. when it labors, this can also be detected, reported and evaluated at once.

Of importance for the invention are the central control or regulation and control of all measuring, instruction and setting signals during processing of fiber material by the microcomputer, or microprocessor system. The microcomputer is thus used for regulating functions, e.g. regulation of the speed of the feed roller, of the doffer and the like. Additionally, the microcomputer is used for control functions, e.g. on/off switching of the carding machine or roller card, control of the velocity stages of the rollers, e.g. of the licker-in, the cylinder, the doffer for start-up movement, fast movement and slow movement and the like.

The present invention will now be explained in greater detail with reference to embodiments that are illustrated in the drawings.

BRIEF DESCRIPTION OF THE DRAWING

FIG. 5 is a programming flow diagram illustrating the operation performed in a control system according to the invention.

FIG. 6 is a programming flow diagram illustrating a modified version of the operation depicted in FIG. 5.

DESCRIPTION OF THE PREFERRED EMBODIMENTS

Figure 1:
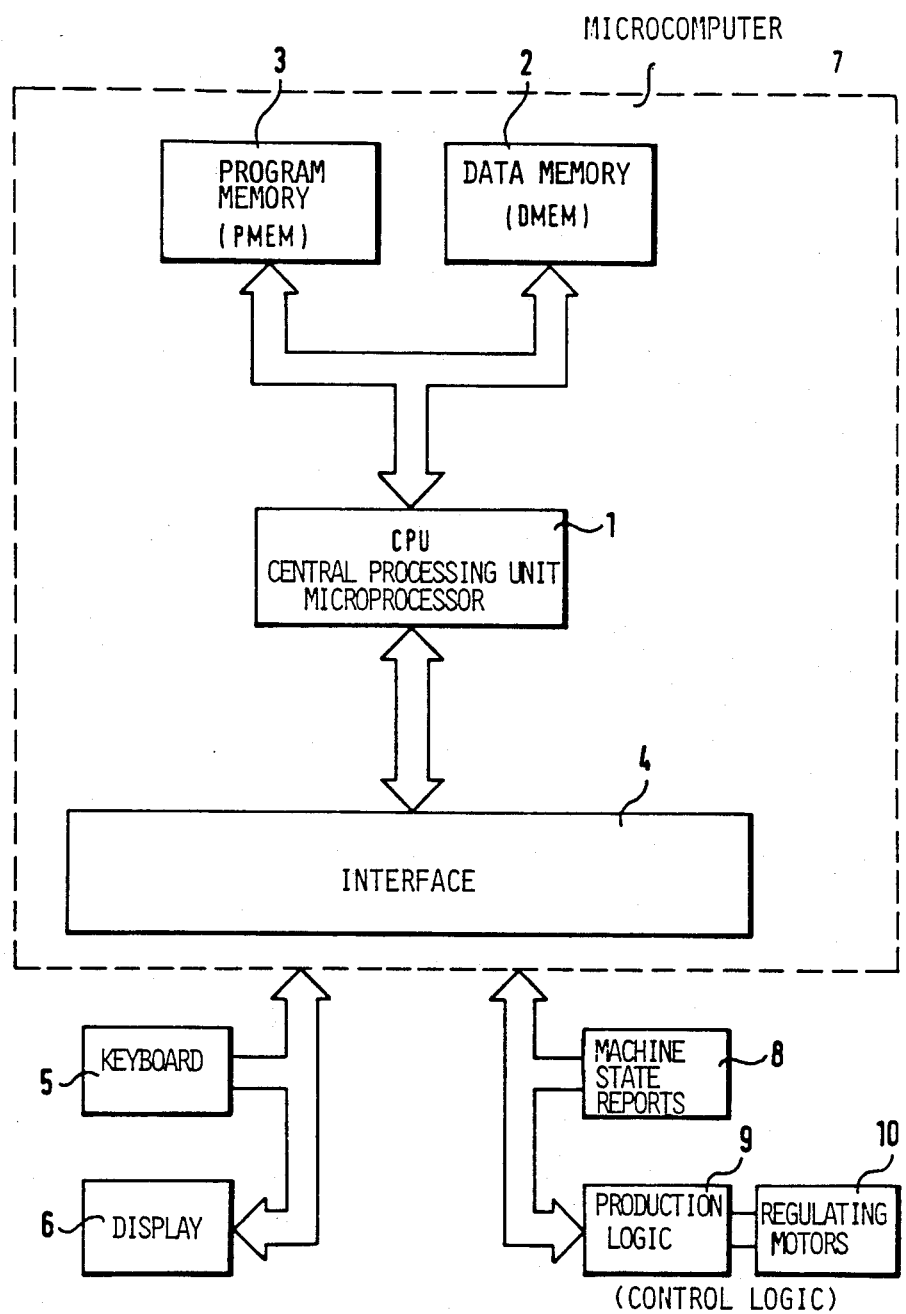
FIG. 1 is a block circuit diagram of a fully automatic control for a carding machine or a roller card according to the invention.

The control system shown in FIG. 1 has a microprocessor 1 as the central processing unit, CPU, connected on the one hand, with a data memory 2 and a program memory 3 and, on the other hand, with an interface 4. These control members 1 through 4 in their entirety constitute a microcomputer 7.

The memory 2 receives the data for the respective production program as fed in by the operator via keyboard 5. Permanently programmed data for the sequence control for each production program are stored in the memory 3. These are data, inter alia, which permit or suppress certain machine functions upon the occurrence of certain determined operating states. These data determine, for example, the permissible speed range of the doffer.

The microprocessor 1, on the one hand, produces all control signals required to operate the microcomputer and, on the other hand, performs, under control of the program stored in the PMEM memory 3, all data transfers between the memories and the external circuits and devices which are coupled in via the interface 4. Moreover, the microprocessor 1 makes all necessary calculations and decisions as will be explained below.

The interface 4 is basically a buffer memory including input and output registers which make it possible to read into the microcomputer, upon instruction therefrom, external information as input signals, i.e. keyboard signals and signals which represent the machine state, and to read out the information stored therein, i.e. instructions, to transmit them as output signals to the external control logics, display devices and the like.

The external devices include a display 6 with which the significant program data and, for example, information regarding the respective production rate and further machine states are displayed. Various sensors 8 generate reporting signals regarding the machine state. Such signals provide information, for example, as to whether the cylinder of the carding machine is running or not.

Finally, there is provided a production, or control, logic system 9 with connected regulating motors 10 for the transport of material. During automatic operation, the logic system 9 receives its instruction signals from the microcomputer 7 and controls operation, for example, of the feed roller and of the doffer in dependence on the production program.

As already mentioned above, the production programs are fed into the memory 2 via an input device, e.g. the keyboard 5. The depression of a program key on keyboard 5 generates a code which is read into the microprocessor 1 via the interface 4. The microprocessor determines whether the respective code represents an instruction, i.e. for example, storing, erasing or using a signal, or information for the production program. In the former case, the respective instruction is followed. If the microprocessor 1 determines that an instruction signal means "store", it causes the last fed-in data to be transferred into memory 2. In the latter case, numbers or functions are intermediately stored in the data memory 2 for later use.

Figure 2:
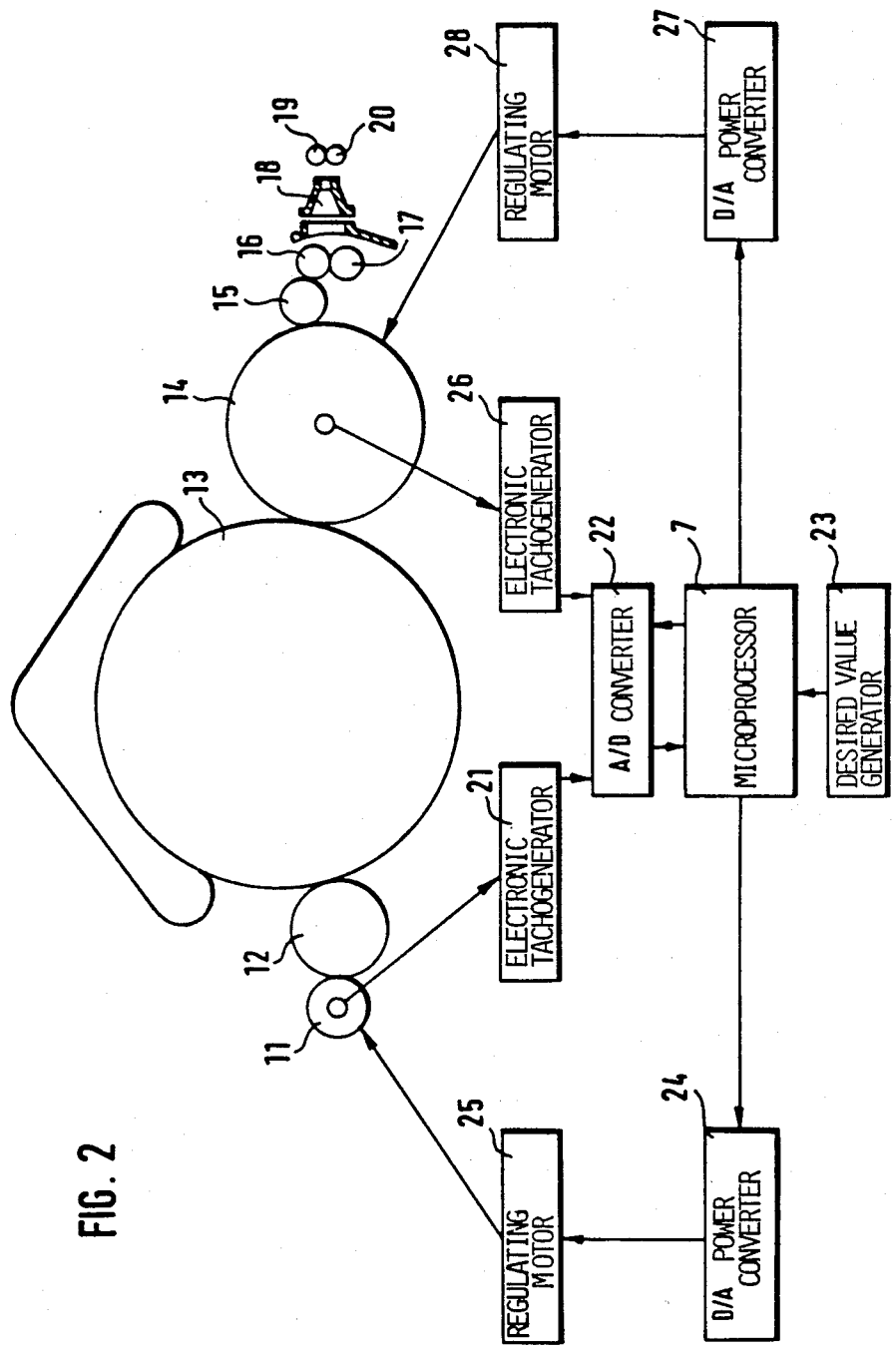
FIG. 2 is a block circuit diagram of a system for the regulation of the feed roller and of the doffer of the carding machine and a simplified representation of the machine itself.

FIG. 2 is a schematic representation of a carding machine which can be controlled according to the invention. This machine includes a feed roller 11, a licker-in 12, a carding cylinder 13, a doffer 14, a stripper roller 15, two pinch rollers 16 and 17, a trumpet 18 and two calender rollers 19 and 20 which deliver a sliver. The feed roller 11 has an associated sensor in the form of an electronic tachogenerator 21 which is connected to an analog/digital converter 22. The analog/digital converter 22 is connected to the microcomputer 7, via its microprocessor interface 4. The analog/digital converter 22 is in turn controlled by the microcomputer 7. The microcomputer 7 is also associated with a desired value generator signal 23.

The microcomputer 7 is connected to a first digital-/analog power converter 24 which is controlled by the microprocessor 1 and is in communication with a regulating motor 25 for driving the feed roller 11. The doffer 14 similarly has an associated electronic tachogenerator 26 constituting a measured value sensor, which is connected to the analog/digital converter 22. The microcomputer 7 is additionally connected to a second digital/analog power converter 27 which is in communication with the regulating motor 28 for the doffer 14.

As will be apparent, elements 21, 22 and 26 of FIG. 2 form components of unit 8 of FIG. 1, while elements 24, 25, 27 and 28 of FIG. 2 form part of unit 10 of FIG. 1.

During operation, the speeds of the feed roller 11 and of the doffer 14 are converted to speed-proportional analog electrical signals by the tachogenerators 21 and 26, respectively, which form input signals for the microcomputer 7. From the input signals and the stored program data, electrical output signals are developed via the microprocessor 1. These digital signals are converted back to analog electrical signals by the subsequent digital/analog power converters 24 and 27, respectively, and then are fed to the regulating motors 25 and 28, respectively by which the rotation of the feed roller 11 and the doffer 14, respectively, are controlled.

Figure 3:
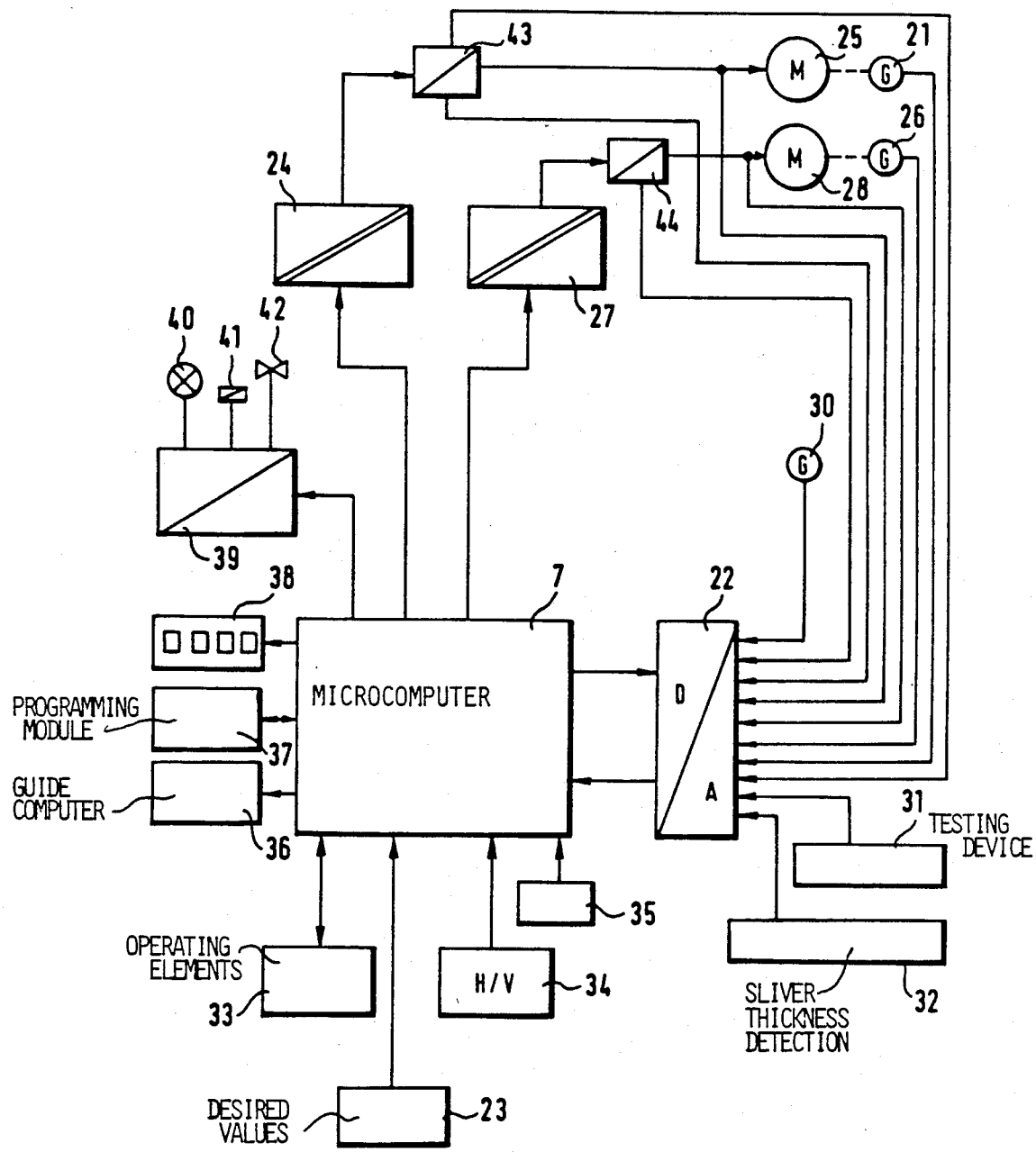
FIG. 3 is a block circuit diagram of a control system according to the invention performing further regulating and control functions.

FIG. 3 shows a control arrangement similar to that of FIG. 2 but constructed to perform additional regulating and control functions. The carding cylinder has an associated measured value sensor in the form of an electrical techogenerator 30 which is connected to the analog/-digital converter 22. Also connected to the analog/digital converter is a testing device 31. Finally, an analog signal is fed to the analog/digital converter from a sliver thickness measuring device 32 which will be described in greater detail with reference to FIG. 4.

The following devices are further connected electrically to the microcomputer:

operating elements, such as on/off switches for the carding machine and the like; a device 34 for the input of preliminary or primary signals, e.g. identifying the degree of can fill; monitoring members 35 which report malfunctions in the system, or in the operating sequence, respectively; a higher order guide computer 36 for a plurality of carding machines or roller cards; a programming module 37 with which variable data can be programmed once or when they change; a display device 38 to display production and counter states; and a control device 39, with which, for example, signal lights 40, relays 41 and valves 42 can be controlled directly.

The digital/analog power converters 24 and 27 are in communication with the regulating motors 25 and 28 via devices 43 and 44, respectively.

Device 43, 44 is, for example, a measuring device for motor current and/or motor voltage. To measure the motor current, for example, device 43, 44 includes a shunt and an operational amplifier. The input signal is the motor current and/or the motor voltage. The output signal is an equivalent measurement signal (resulting from the measurement), the measurement of the motor current also producing a voltage as the output signal.

Figure 4:
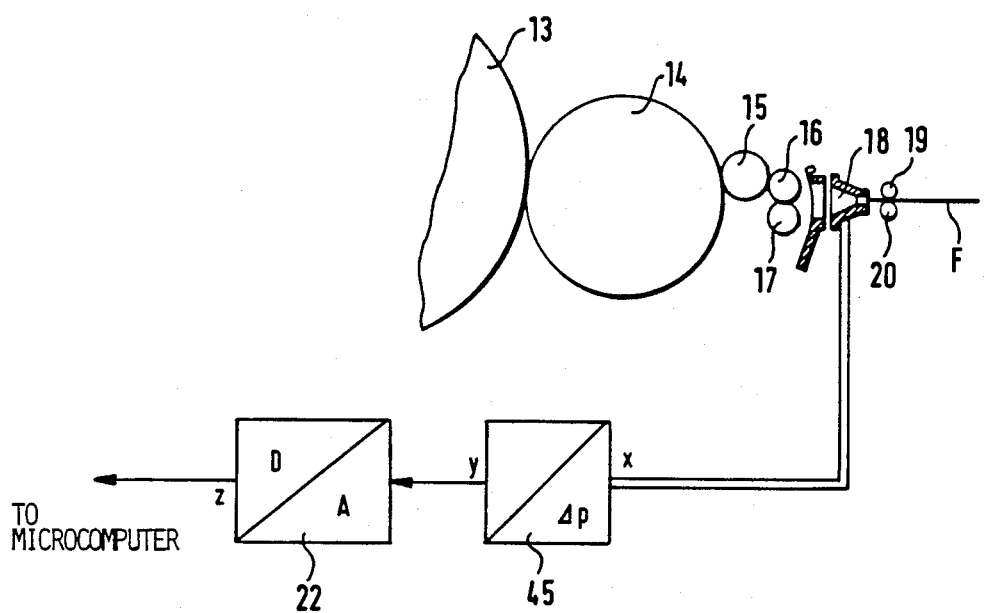
FIG. 4 is a detail view of a sliver thickness measuring device with transducer for converting pneumatic signals into electrical signals.

As shown in FIG. 4, a sliver F passes through trumpet 18, thus producing a pneumatic signal x which is converted into an electrical signal y in a suitable transducer 45. In the analog/digital converter 22, the signal y is converted into a digital electric signal z, which is fed into the microcomputer 7 (see FIGS. 1 through 3). From this signal, an output signal is developed which serves to control, for example, the rotation of the feed roller 11 to vary the rate at which fibers are fed to the carding machine and thus to regulate the uniformity of the sliver leaving the carding machine.

According to the invention it is possible, by using an electronic microcomputer control and regulating device, to eliminate the need for a considerable amount of apparatus previously required. In particular, the need for a separate control circuit with separate regulating device for each parameter to be regulated can be avoided. It should be noted, for example, that the power converters 27 are not regulating devices but, for example, are only power transistors which are actuated by corresponding pulses from the control device. The regulation of machine dependent and fiber technological data is no longer effected separately but together in the apparatus according to the invention. The particular advantage is that this links together the machine related and the fiber technological characteristics and enables them to act on one another.

For example, the actual values from the sliver thickness measuring device can be processed in the control device and can be used as machine dependent control values for the speed of the feed roller and/or of the doffer of the carding machine. Moreover, for example, the optimum fiber technological data, such as draft, production rate and the like can be measured for a certain lot of fibers and this information can be stored in the control device so that upon later processing of a similar lot the same machine-related control values can be set for the rollers of the carding machine.

Finally, the necessary fiber technological data can be matched to the possible machine output and thus the relationship of carding technology to card structure can be optimized. A further advantage is that for other functions, e.g. the drive and/or the carding technology, a certain regulating behavior can be realized via desired, predeterminable characteristics. As a result, the information required for carding work, such as roller and doffer speeds, sliver thickness, speed ratios and the like, are centrally compiled, evaluated and processed in an optimum manner.

FIG. 5 is a programming flow diagram illustrating the sequence of operations carried out by the microprocessor 1 according to a basic embodiment of the invention. As is the general practice in this art, the operating sequence is performed cyclically at a rate selected to assure that adjustments will be made sufficiently rapidly. Since variations in a carding process occur very slowly compared to conventionally microprocessor cycle times, this requirement does not present any difficulty in the present case, particularly given the relatively small number of steps involved in a complete operating cycle.

In the operating sequence depicted in FIG. 5, the first calculation block indicates that the desired and actual values for the speeds of the doffer 14 and the feed roller 11 are determined based on values provided by the data memory 2 and the tachogenerators 21 and 26. The desired and actual values for the doffer speed are compared and the comparison result is supplied to the second control block. If equality does not exist, a new doffer speed control value is determined, as indicated by the second calculation block, to supply a control value which will bring the doffer speed to the desired value. The control value is supplied to power converter 27.

If the actual and desired doffer speed values are found to be equal, or after determination of a new doffer speed control value, the result achieved by comparison of the actual and desired speed values for the feed roller are supplied to the second decision block. If this comparison result indicates that the values are not equal, a new feed roller speed control value is determined in the following calculation block, and the new control value is supplied to power converter 24.

If the actual and desired speed values for the feed roller were found to be equal, or after determination of a new feed roller speed control value, the desired and actual sliver thickness values are stored. The desired value can be supplied from the data memory 2, while the actual sliver thickness value will be derived from regulator 45 via converter 22. These values are then compared and the comparison result is supplied to a further decision block.

If this decision block indicates that the values are not equal, the last calculation block indicates that a new desired value for the doffer and/or feed roller speed is calculated. These calculations will, of course, be based on relationships between sliver thickness and doffer and feed roller speeds which are already well known in the art. The new desired value, or values, are then supplied to the first calculation block. If the last decision block indicates equality between the actual and desired sliver thickness values, the operating sequence returns to the input of the first decision block.

Into the data memory 2 (see FIG. 1), of microcomputer 7 (see FIGS. 1 and 3), signals are fed which represent the actual value recorded by the electrical tachogenerator 30 (see FIG. 1) serving as the measuring value sensor for the rpm of the drum 13 (see FIG. 2).

Into the data memory 2 (see FIG. 1), signals are fed which represent the actual value of the motor current determined by the measuring device 43 (see FIG. 3) for the drive of the feed roller 11 (see FIG. 2).

Into the data memory 2 (see FIG. 1), signals are fed which represent the actual value of the motor current determined by the measuring device 44 (see FIG. 3) for the drive of the doffer 14 (see FIG. 2).

Into the data memory 2 (see FIG. 1), signals are fed which represent the motor voltage determined by the measuring device 43 (see FIG. 3) for the drive of the feed roller 11 (see FIG. 2).

Into the data memory 2 (see FIG. 1), signals are fed which represent the actual value of the motor voltage determined by measuring device 44 (see FIG. 3) for the drive of the doffer 14 (see FIG. 2).

Into the data memory 2 (see FIG. 1), signals are fed from a known testing device 31 (see FIG. 3). Such a testing device is known, for example, from the brochure "Pocket VDU-Fully Alphanumeric Hand-Held Terminal" by Neumünster Messtechnik.

Into the data memory 2 (see FIG. 1) signals are fed from machines connected ahead of the carding machine (see FIG. 2) or the roller card, for example a tuft supplier 46 (see FIG. 3) as disclosed in U.S. Pat. No. 3,169,664 or U.S. Pat. No. 4,219,828 or a known fine opener.

Into the data memory 2 (see FIG. 1), signals are fed from a machine connected downstream of the carding machine (see FIG. 2), for example from a drawing mechanism 47 as disclosed in U.S. Pat. No. 4,199,844 (see FIG. 3).

Into the data memory 2 (see FIG. 1), signals are fed from monitoring elements 35 (see FIG. 3), for example from a known motor protection switch.

Into or out of the data memory 2 (see FIG. 1), signals are fed from and/or to a higher order known guide computer 36 (see FIG. 3), a higher order control or the like for a plurality of cards or roller cards.

Into or out of the data memory 2 (see FIG. 1) signals are fed from and/or to a known programming module 37 (see FIG. 3). Such a programming module is known, for example, from the brochure "Pocket VDU-Fully Alphanumeric Hand-Held Terminal" by Neumünster Messtechnik.

Into or out of the data memory 2 (see FIG. 1), signals are fed from and/or for the machine operation 33 (see FIG. 3), for example known devices to switch on and off the carding machine or roller card.

The invention includes control as well as regulating functions, i.e. control as well as regulating processes can be realized.

FIG. 6 shows a similar flow diagram as FIG. 5. Here, the desired and given value for the doffer speed and the desired and given value for the feed roller speed are initially calculated. The results of this calculation are processed further in the same manner as shown in FIG. 5. In contradistinction to FIG. 5, after the last calculation box, the operating sequence returns to the input of the first decision box. While in FIG. 5 actual values are determined in the first calculation box, at the input of FIG. 6 control values are calculated instead.

It will be understood the above description of the present invention is susceptible to various modifications, changes and adaptations and the same are intended to be comprehended within the meaning and range of equivalents of the appended claims.

What is claimed is:

1. Apparatus for forming fiber material into a length of sliver, comprising: carding means, comprising a carding cylinder, a feed roller and a doffer, for receiving such fiber material and forming it into the length of sliver; sensing means for monitoring the operation of said carding means and providing signals representative of that operation; analog/digital converter means connected to said sensing means for receiving the signals provided by said sensing means and converting those signals into digital representations of the operation of said carding means; a digital electronic control unit connected to receive the digital representations formed by said analog/digital converter means and including a microprocessor having memories, means for generating digital representations of desired values of selected operating parameters of said carding means, and means performing operational, regulating, control and display functions, said control unit being arranged to provide digital signals for regulating the operation of said carding means; digital/analog converter means connected to said control unit for deriving analog signals corresponding to the digital signals provided by said control unit; and controllable regulator means controlled by the analog signals derived by said digital/analog converter means for regulating the operation of said carding means; said control unit supplying signals via said converter means to said regulator means for matching the speeds of said carding cylinder, said feed roller and said doffer to one another.

2. Apparatus as defined in claim 1 wherein said control unit comprises means for controlling said analog/digital converter means.

3. Apparatus as defined in claim 1 or 2 wherein said microprocessor comprises means for storing the digital representations formed by said analog/digital converter means in said memories.

4. Apparatus as defined in claim 1 wherein said sensing means monitor the actual operating speed of said feed roller, and said control unit supplies digital representations of speed values monitored by said sensing means to said memories.

5. Apparatus as defined in claim 1 wherein said microprocessor comprises means for feeding digital representations of the actual value of the speed of said carding cylinder into said memories.

6. Apparatus as defined in claim 1 wherein said sensing means monitor the speed of said doffer, and said microprocessor comprises means for feeding digital representations of the actual speed of said doffer into said memories.

7. Apparatus as defined in claim 1 wherein said carding means comprise a motor driving said feed roller, said sensing means monitor the current supplied to said motor of said feed roller, and said microprocessor comprises means for feeding digital representations of the actual value of the motor current for said feed roller into said memories.

8. Apparatus as defined in claim 1 wherein said carding means comprise a motor driving said doffer, said sensing means monitor the current supplied to said motor of said doffer, and said microprocessor comprises means for feeding digital representations of the actual value of the motor current for said doffer into said memories.

9. Apparatus as defined in claim 1 wherein said carding means comprise a motor having said feed roller, said sensing means monitor the voltage applied to said motor of said feed roller, and said microprocessor comprises means for feeding digital representations of the actual value of the motor voltage for said feed roller into said memories.

10. Apparatus as defined in claim 1 wherein said carding means comprise a motor driving said doffer, said sensing means monitor the voltage applied to said motor of said doffer, and said microprocessor comprises means for storing digital representations of the actual value of the motor voltage for said doffer in said memories.

11. Apparatus as defined in claim 1 further comprising a testing device connected for testing the operation of said apparatus.

12. Apparatus as defined in claim 1 wherein said sensing means comprise a device for producing signals representing the actual value of the thickness of the sliver, and said microprocessor comprises means for feeding digital representations of such signals into said memories.

13. Apparatus as defined in claim 1 wherein said microprocessor comprises means for feeding digital representations of the actual value of the quantity of fiber passing through said machine into said memories.

14. Apparatus as defined in claim 1 wherein said microprocessor comprises means for feeding digital representations of the operating conditions of devices disposed ahead of said carding means into said memories.

15. Apparatus as defined in claim 1 wherein said microprocessor comprises means for feeding digital representations of the operating conditions of devices disposed after carding means into said memories.

16. Apparatus as defined in claim 1 wherein said microprocessor comprises means for delivering operational control value digital representations for controlling said carding means into said memories.

17. Apparatus as defined in claim 1 wherein said microprocessor comprises means for feeding digital representations of signals from said sensing means into said memories in order to indicate operational malfunctions.

18. Apparatus as defined in claim 1 further comprising higher order control means for a plurality of carding means connected to transmit digital representations to, and receive digital representations from, said memories.

19. Apparatus as defined in claim 1 further comprising a programming module connected to transmit data representations to, and receive data representations from, said memories for permitting reprogramming of variable data for said carding means as desired.

20. Apparatus as defined in claim 1 wherein said memories are connected for providing digital representations for transmission to, and for receiving digital representations from, a machine operator so as to change the state of said machine.

21. Apparatus as defined in claim 1 wherein said regulator means are connected to transmit digital representations to, and receive digital representations from, said memories.

22. Apparatus as defined in claim 1 wherein said memories provide digital representations for transmission to said digital/analog converter means for controlling the operation of said feed roller.

23. Apparatus as defined in claim 1 wherein said memories provide digital representations for transmission to said digital/analog converter means for controlling the operation of said doffer.

24. Apparatus as defined in claim 1 wherein said microprocessor comprises means for reading digital representations of signals for operational control elements of said carding means out of said memories.

* * * * *